United States Patent [19]

Borgos et al.

[11] Patent Number: 4,875,755
[45] Date of Patent: Oct. 24, 1989

[54] FIBER OPTIC CONNECTOR ASSEMBLY AND METHOD OF MAKING SAME

[75] Inventors: John A. Borgos; Francis Bradac, both of St. Paul; Daniel J. Haumschild, Coon Rapids; Timothy Johnson, New Brighton, all of Minn.; Rebecca Lee, Albuquerque, N. Mex.

[73] Assignee: TSI Incorporated, St. Paul, Minn.

[21] Appl. No.: 226,825

[22] Filed: Aug. 1, 1988

Related U.S. Application Data

[62] Division of Ser. No. 907,086, Sep. 15, 1986, Pat. No. 4,772,081.

[51] Int. Cl.$^4$ .................................................. G02B 6/36
[52] U.S. Cl. .............................. 350/96.20; 350/96.21; 350/96.22; 350/320
[58] Field of Search .............. 350/96.20, 96.21, 96.22, 350/320, 96.10

[56] References Cited

U.S. PATENT DOCUMENTS

| | | | |
|---|---|---|---|
| 4,167,303 | 9/1979 | Bowen et al. | 350/96.21 |
| 4,167,304 | 9/1979 | Gelbke | 350/96.21 |
| 4,303,304 | 12/1981 | Ruiz | 350/96.20 |
| 4,362,356 | 12/1982 | Williams et al. | 350/96.20 |
| 4,377,322 | 3/1983 | Ransley et al. | 350/96.20 |
| 4,429,949 | 2/1984 | Cartier | 350/96.21 |
| 4,444,516 | 4/1984 | Dostoomian et al. | 350/96.20 X |
| 4,458,983 | 7/1984 | Roberts | 350/96.20 |
| 4,515,434 | 5/1985 | Margolin et al. | 350/96.21 |
| 4,549,783 | 10/1985 | Schmachtenberg, III | 350/96.20 |
| 4,553,813 | 11/1985 | McNaughton et al. | 350/96.20 |
| 4,611,886 | 9/1986 | Cline et al. | 350/96.20 |
| 4,648,688 | 3/1987 | Ashman et al. | 350/96.20 |
| 4,657,340 | 4/1987 | Tanaka et al. | 350/96.20 |
| 4,673,245 | 6/1987 | Kling et al. | 350/96.20 |
| 4,708,431 | 11/1987 | Pikulski et al. | 350/96.20 |
| 4,746,194 | 5/1988 | Rasmussen | 350/320 |
| 4,772,081 | 9/1988 | Borgos et al. | 350/96.20 |
| 4,773,725 | 9/1988 | Ashman et al. | 350/96.20 |
| 4,787,698 | 11/1988 | Lyons et al. | 350/96.20 |
| 4,815,811 | 3/1989 | Crosnier et al. | 350/96.20 |

FOREIGN PATENT DOCUMENTS 2502798 1/1982 France .................... 350/96.21 X

Primary Examiner—William L. Sikes
Assistant Examiner—Brian M. Healy
Attorney, Agent, or Firm—Burd, Bartz & Gutenkauf

[57] ABSTRACT

An optical fiber connector assembly for coupling an optical fiber cable having optical fibers to an instrument equipped with a light source and a photodetector. The connector assembly has a housing accommodating a pair of ferrules that support the optical fibers. The ferrules have cone-shaped heads and generally flat forward ends. The optical fibers have ends that are flush with the flat ends of the heads. The heads of the ferrules seat into cone-shaped reccesses in receptacles mounted on the instrument. The light source and photodetector are aligned with the receptacles so that the light from the light source is transmitted to a first optical fiber and the light from second optical fibers is received by the photodetector. A screw mounted on the housing is threaded into a hole in the instrument to releasably connect the housing to the instrument and locate the heads in alignment with the cone-shaped recesses in the receptacles. Biasing means associated with the ferrules continuously bias and seat the heads in the cone-shaped recesses to maintain the alignment of the ends of the optical fibers with the light source and photodetector.

14 Claims, 4 Drawing Sheets

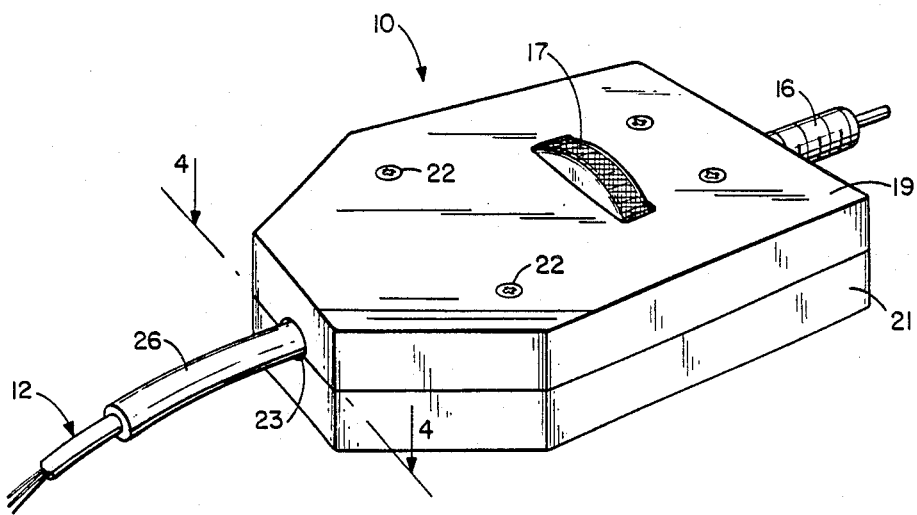
FIG. 3
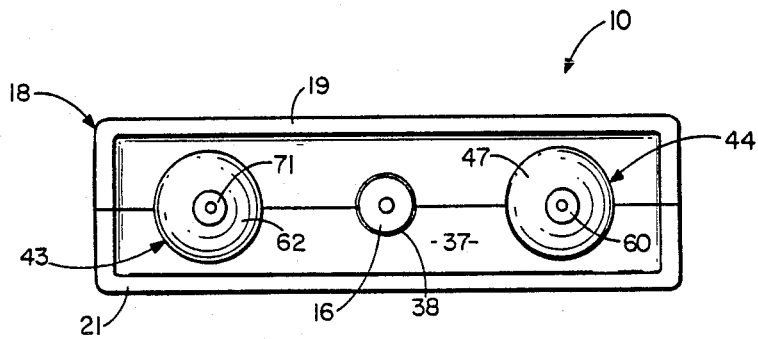
FIG. 5
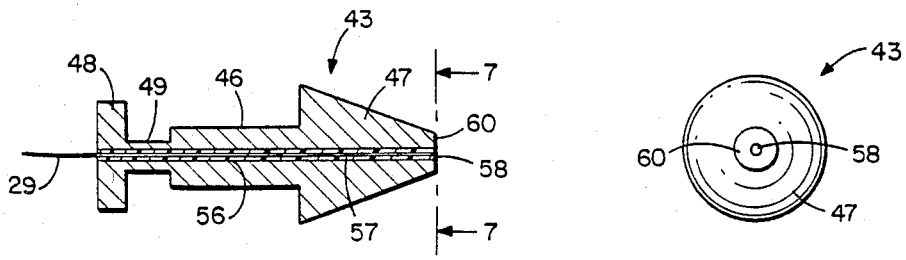
FIG. 6
FIG. 7

FIBER OPTIC CONNECTOR ASSEMBLY AND METHOD OF MAKING SAME

This is a division of application Ser. No. 907,086, filed 9/15/86, now U.S. Pat. No. 4,772,081.

FIELD OF INVENTION

The invention relates to fiber optic connector assemblies for joining fiber optic cables to instruments and joining fiber optic cables together.

BACKGROUND OF INVENTION

Light is used by instruments to measure the flow or movement of gases, liquids and solids. These instruments include laser anemometers, blood perfusion monitors and systems that measure solid surface motion. The Doppler principle is the basic operating principle for each of these instruments. Light is focused on the moving material and is scattered by collisions which occur between photons of light and particles in the material. These collisions impart a frequency shift to the photons which is proportional to the velocity of the moving material. This frequency shift is difficult to measure directly, but by mixing the frequency-shifted light with light that has not been frequency-shifted, a slower beat frequency results. The beat frequency is also proportional to the velocity of the moving material and it can be measured. An example of this instrument is disclosed in U.S. Pat. No. 4,387,993. Flow measurements of this type require that the light have a single wavelength so these instruments usually use a laser or a laser diode as a light source. The light is focused at the measurement location by the focusing or transmitting optics. The receiving optics collect the scattered light and focus is onto the surface of a photo detector. The beat frequency results from the mixing of frequency-shifted light with light that has not been frequency-shifted on the surface of the photo detector. The photo detector converts this beat frequency to an electrical frequency which is then converted into a velocity or a flow measurement by electronic signal processing.

Optical fibers are used to replace all or part of the focusing and/or the receiving optics in these instruments. Incorporating fiber optics makes the instruments safer and easier to use and allows access to otherwise inaccessible measurement situations. A blood perfusion monitor, for example, both transmits light to and collects light from the measurement location with optical fibers. The measurement location in this case is the capillary bed just below the surface of a tissue, such as skin. The instrument noninvasively measures blood flow through the capillary bed. Using optical fibers in the blood perfusion monitor allows blood flow measurements to be made conveniently and safely because the fibers electrically isolate the patient from the instrument.

Whenever optical fibers are used to transmit light, an effective means must be used to connect the fibers to the rest of the system. The main requirement of this connection is that it provide good coupling of light from a light source into a fiber or from one fiber into another. In the case of flow-measuring instruments, the optical fiber that transmits light to the measurement location must have a small core diameter, on the order of 50 microns or less. Achieving good coupling of light from light source into fiber in these instruments is difficult. Once an instrument has been aligned, a change in location of the fiber end of even 10 microns can cause a substantial loss in the amount of light transmitted. Good alignment in the connection between the light source and the optical fiber can be achieved during the manufacturing process and the components can then be permanently fixed in place so that the connection cannot be broken. If a permanent connection between the light source and the optical fiber is not desirable, a connector having position adjustments can be used. Each time the optical fiber is connected to the light source, the user aligns the fiber so that a maximum amount of light is coupled into it. This type of connector requires that the user have the equipment and the skills necessary to make the alignment.

Optical fiber connector systems having quick connect and disconnect optical terminators without position adjustments are described by Cartier in U.S. Pat. No. 4,429,949 and McNaughton et al in U.S. Pat. No. 4,553,813. A rigid sleeve and a plurality of balls are used by Cartier to radially center optical fibers. McNaughton et al utilizes a clamp to hold an optical fiber connector on diverging ears to align optical fibers.

SUMMARY OF INVENTION

The invention is directed to a fiber optic connector assembly usable to connect and disconnect an optical fiber cable to an instrument with no substantial change in light transmitting efficiency. The connector assembly provides excellent alignment between a light source and optical fibers which requires neither adjustment nor a permanent connection between the optical fiber cable and the instrument. The optical fiber connector assembly of the invention is also usable to couple two optical fiber cables together in a manner to radially align adjacent optical fiber ends.

An embodiment of the optical fiber connector assembly couples an optical fiber cable with an instrument. The cable has a plurality of optical fibers for transmitting light. The instrument has a panel operable to support a connector housing. The housing has an end located adjacent the panel provided with a recess. A releasable fastener holds the housing in engagement with the panel. The housing has means to hold an optical fiber cable and passage means for accommodating the separate optical fibers emanating from the cable. Ferrule means are retained in the housing for supporting the optical fibers. Each ferrule means has a body and a cone-shaped head. The head terminates in a forward flat end. The optical fibers have ends that are flush with the forward end of the head. Members mounted on the panel have cone-shaped recesses for accommodating the cone-shaped head to accurately align the ends of the optical fibers with a light source and a photodetector. In one form of the connector assembly, the housing accommodates two ferrules each having cone-shaped heads. One ferrule is used to accommodate an optical fiber which guides light from a light source to a measurement location. The second ferrule terminates a return optical fiber or fibers which guide scattered light from the measurement location to a photodetector.

An objective of the present invention is to provide a optical fiber connector assembly which can be easily connected to and disconnected from an instrument and which repetitively maintains the radial alignment of the ends of optical fibers with means having light transmitting or utilizing characteristics, such as a light source, a photodetector or other optical fiber. These and other advantages and features of the optical fiber connector assembly of the invention are embodied in the following detailed disclosure of an embodiment of the optical connector assembly.

DESCRIPTION OF DRAWING

FIG. 3 is a perspective view of the optical fiber connector assembly of FIG. 1;

FIG. 5 is an enlarged end view of the right or forward end of the optical fiber connector assembly of FIG. 3;

FIG. 6 is an enlarged sectional view taken along the line 6—6 of FIG. 4;

FIG. 7 is an end view taken along the line 7—7 of FIG. 6;

DESCRIPTION OF PREFERRED EMBODIMENT

Figure 1:
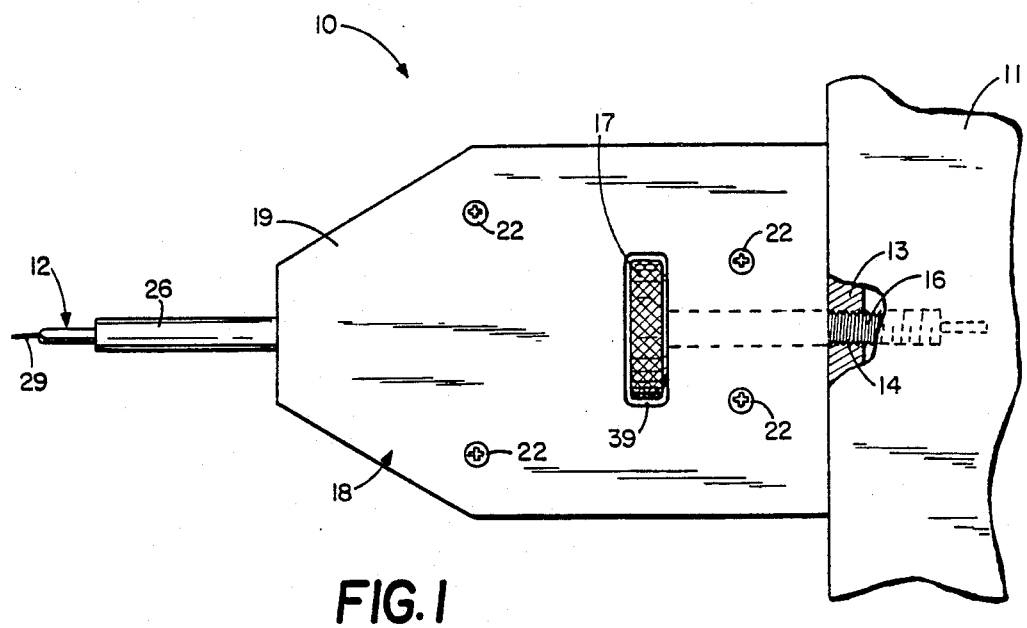
FIG. 1 is a plan view of the optical fiber connector assembly of the invention coupled to an instrument.
Figure 2:
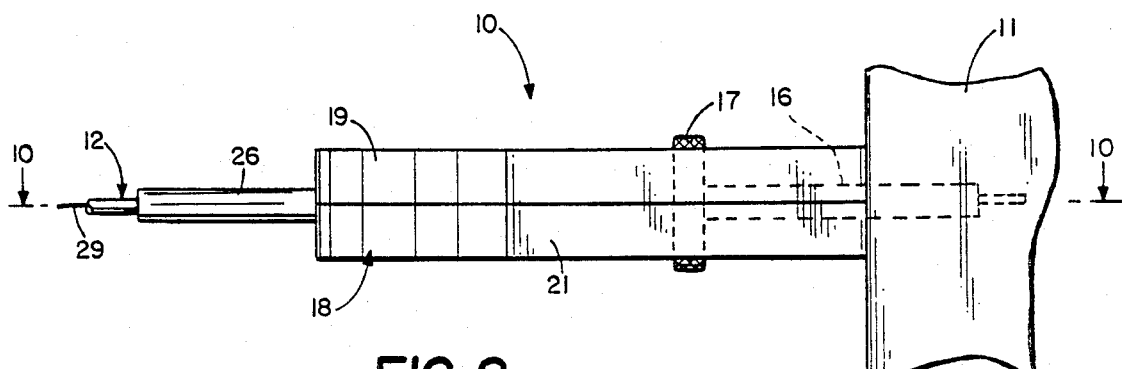
FIG. 2 is a side elevational view of the optical fiber connector assembly of FIG. 1.

Referring to FIGS. 1 and 2, there is shown a fiber optic connector assembly of the invention indicated generally at 10 coupled to an instrument 11, such as a blood perfusion monitor. Instrument 11 includes laser anemometers, blood perfusion monitors, systems that measure solid surface motion and fiber optics communications systems. Examples of these instruments are shown in U.S. Pat. Nos. 4,387,993 and 4,596,254. Connector assembly 10 joins a optical fiber cable 12 to front panel 13 of instrument 11. Front panel 13 has a threaded hole 14 receiving a screw 16. Screw 16 is attached to a knob 17 that is rotatable to join and hold connector to instrument 11. Other support structures in lieu of panel 13 can be used to hold housing 18.

Figure 4:
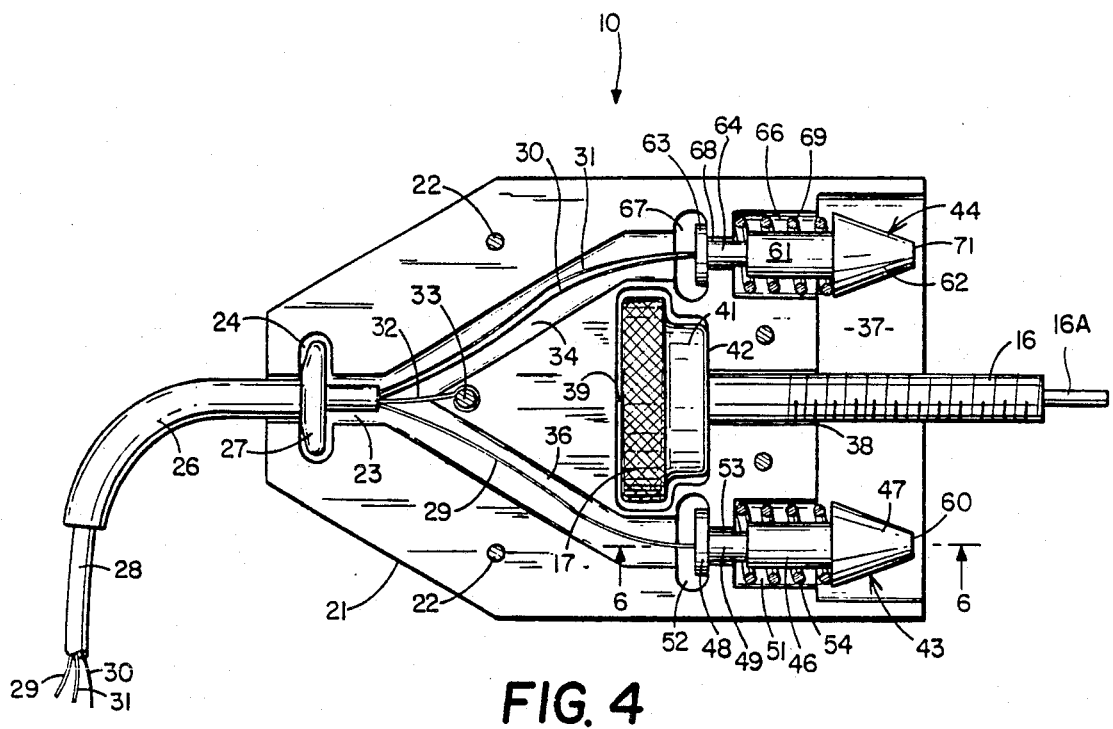
FIG. 4 is an enlarged sectional view taken along the line 4—4 of FIG. 3.

Connector assembly 10 has a housing, indicated generally at 18, made of plastic or similar non-electrically conductive material. Housing 18 has an upper casing 19 and a lower casing 21 secured together with a plurality of screws 22. Casing 19 and 21 are a mateable set. The following description is limited to casing 21. As shown in FIG. 4, the rear portion of casing 21 has a passage 23 interrupted with a lateral recess 24. A flexible boot 26 having an annular flange 27 is located in lateral recess 24. Boot 26 fits about optical cable 12 to protect cable 12 from breaking at the junction with housing 18. Boot 26 fits over jacket 28 that surrounds optical fibers 29, 30, and 31. Aramid fibers 32 surround optical fibers 29, 30, and 31 inside of jacket 28 to protect and provide strain relief for the optical fibers. A screw 33 anchors the aramid fibers 32 to housing 18 to prevent separation of cable 12 from housing 18. Other types of optical cables having different axial strain relief structures can be used with connector assembly 10.

Passage 23 leads to diverging channels 34 and 36 that are open to a cavity or recess 37 in the forward end of housing 18. The center of housing 18 has a passage 38 accommodating screw 16. Passage 38 extends between recess 37 and a transverse opening 39 accommodating knob 17. Knob 17 has an annular boss 41 that bears against an annular shoulder 42 on housing 18 to hold connector 10 in a tight relationship relative to instrument 11 when screw 16 is turned into threaded hole 14.

Optical fiber 29 is connected to a first ferrule 43. Optical fibers 30 and 31 are connected to a second ferrule 44. Ferrule 43 has a cylindrical shank or body 46 joined to a conical shaped head 47. A circular stop 48 is joined to the rear end of body 46 with a neck 49. Body 46 is located within a cavity 51 forming the terminal end of channel 36. A lateral recess 52 accommodates stop 48. Stop 48 is larger than passage 53 to retain ferrule 43 in limited movable assembled relation within housing 18. A coil spring 54 located about body 46 biases ferrule in a forward direction and retains stop 48 in engagement with housing 18. Spring 54 also allows ferrule 43 limited radial movement relative to housing 18.

As shown in FIG. 6, ferrule 43 is a one-piece member having a longitudinal hole 56. Optical fiber 29 extends through hole 56. An epoxy 57 in hole 56 fixes the position of optical fiber 29 relative to ferrule 43. The forward end 58 of fiber 29 is polished until it is smooth and flush with the flat front face 60 of head 47. As shown in FIG. 7, end 58 of fiber 29 is centered in front face 60. End 58 of optical fiber 29 is centered on ferrule head 47 by means of a grinding process performed after the optical fiber 29 has been epoxied to the ferrule. The cone-shaped head 47 has a slightly oversized taper. The ferrule and the fiber are centered on a grinder operable to precision grind the outer conical surface of head 47 to ensure concentricity with end 58 of optical fiber 29. Head 62 of ferrule 44 is made in the same manner. Returning to FIG. 4, ferrule 44 has a cylindrical shank or body 61 joined to a conical-shaped head 62. A stop 63 is connected to body 61 with a neck 64. Body 61 is located in a cavity 66 in housing 18. Neck 64 extends through a passage 68 to position stop 63 in a lateral recess 67. A coil spring 69 biases ferrule 44 in a forward direction. Optical fibers 30 and 31 extend through a hole along the longitudinal axis of ferrule 44. Epoxy secures the fibers to ferrule 44. The forward end 71 of head 62 is polished so that the ends of the fibers 30 and 31 are centrally located and flush with end 71.

When the upper and lower casings 19 and 21 are secured together the bodies 46 and 61 of ferrules 43 and 44 are located in cylindrical recesses 51 and 66. Springs 54 and 69 bias heads 47 and 62 outwardly into end recess 37. Stops 48 and 63 engage casings 19 and 21 to limit the outward movement of ferrules 43 and 44 and retain heads 47 and 62 in end recess 37. Recesses 52 and 67 have widths that are greater than the thickness of stops 48 and 63 thereby allowing the ferrules to have limited longitudinal movement relative to housing 18. Springs 54 and 69 allow ferrules 43 and 44 to have limited radial movement with housing 18.

Figure 8:
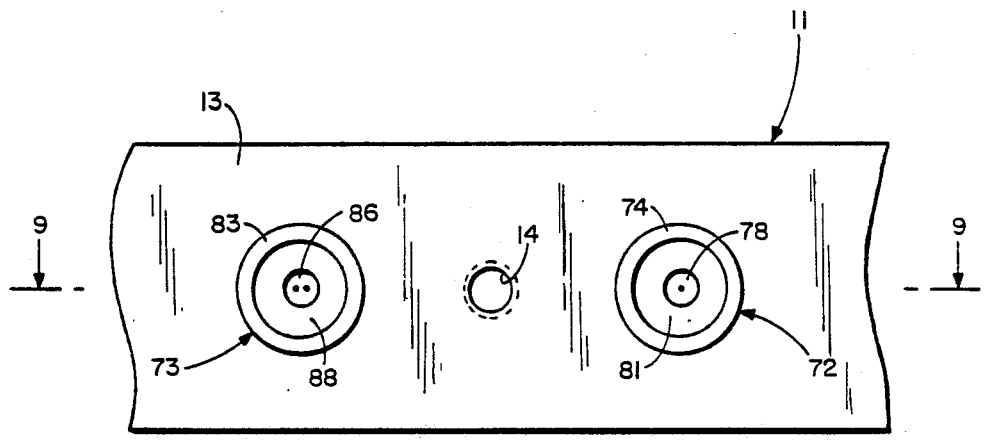
FIG. 8 is an enlarged front view of the panel with connector removed from the panel.
Figure 9:
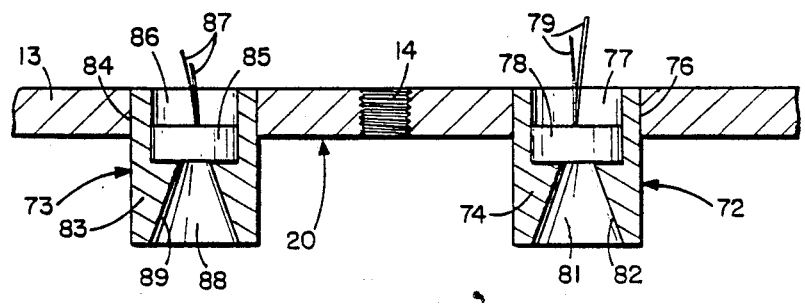
FIG. 9 is a sectional view taken along the line 9—9 of FIG. 8.

Referring to FIGS. 8 and 9, three is shown the front panel 13 of instrument 11 and female members or receptacles 72 and 73 for the heads 47 and 62 of ferrules 43 and 44. Receptacle 72 has a cylindrical body 74 located in a hole 76 in front panel 13. Body 74 is pressed into hole 76 or attached thereto with suitable adhesives or threads. The back of body 74 has a cylindrical recess 77 accommodating a light source 78, such as a light emitting diode or a laser, or provide access for a beam of light from a remote source. A plurality of conductors 79 coupled to light source 78 provides power from the operating circuit of instrument 11. Body 74 has a front truncated cone-shaped hole 81 formed by a cone-shaped side wall 82. Wall 82 is open to recess 77 to expose the central portion of light source 78 to the end of optical fiber or fibers.

Receptacle 73 is identical to receptacle 72. Receptacle 73 has a cylindrical body 83 pressed into a hole 84 in panel 13. The back of body 83 has a recess 86 accommodating a photodetector 85. A plurality of conductors 87 couple photodetectors 85 with the circuit of instrument 11. Body 83 has a cone-shaped side wall 89 forming a truncated cone-shaped hole 88. The bottom of hole 88 is open to recess 86 to expose the ends of optical fibers 30 and 31 to photodetector 85. The receptacle 72 and 73 are located on opposite sides of threaded hole 14.

Figure 10:
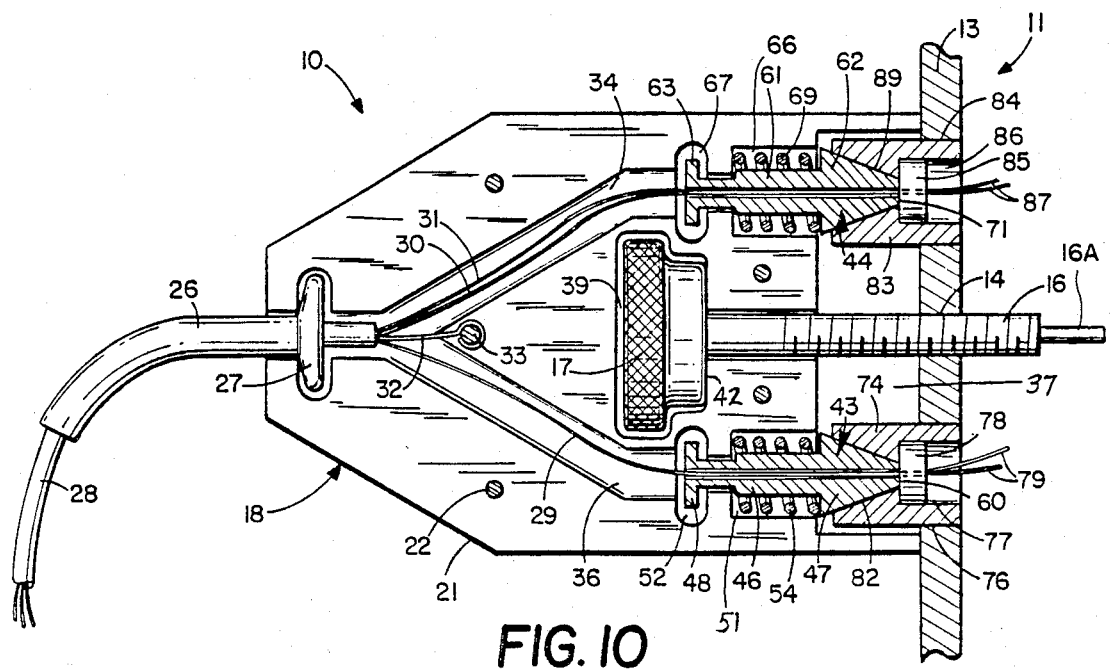
FIG. 10 is a sectional view taken along the line 10—10 of FIG. 2.

Referring to FIG. 10, optical fiber connector housing 18 is mounted in assembled relation with front panel 13 of instrument 11. Other supports can be used to hold housing 18. The forward pilot end 16A of screw 16 is initially aligned with threaded hole 14. This aligns housing 18 and ferrules 43 and 44 mounted in housing 18 with receptacles 74 and 83. Screw 16 is manually turned with knob 17 to thread screw 16 into hole 14. Screw 16 with boss 41 bearing on shoulder 42 of housing 18 holds the forward end of housing 18 surrounding cavity 37 in tight engagement with panel 13. Ferrules 43 and 44 and receptacles 74 and 83 located in cavity 37 are protected by housing 18. As shown in FIG. 2, diametric opposite portions of knob 17 extend away from opposite sides of housing 18 to facilitate the manual manipulation of screw 16. Heads 47 and 62 simultaneously move into the cone-shaped recess of receptacles 74 and 83 respectively when the screw 16 is threaded into hole 14. Head 47 of ferrule 43 fits into the cone-shaped hole 82 in receptacle 74. The cone-shaped side wall of head 47 is seated in surface engagement with the cone-shaped side wall 82. The forward end 60 of head 47 is located adjacent the side of light source 78. Head 47 locates the end of the optical fiber 29 in precise radial alignment with the end of an optical fiber or location of the light source. Spring 54 continuously biases head 47 into the hole in receptacle 74 so as to maintain its aligned position with respect to the receptacle and light source 78.

Cone-shaped head 62 of ferrule 44 is located in the cone-shaped hole 88 in receptacle 83. The outside cone-shaped surface of head 62 is seated in surface engagement with the cone-shaped side wall 89 to accurately align the optical fibers with photodetector 85. The flat end 71 of head 62 is located in contiguous relationship to the inside surface of photodetector 85 to align the ends of optical fibers 30 and 31 with selected portions of photodetector 85. Spring 69 continuously biases head 62 in surface engagement with the side wall 89 and thereby maintaining the radial alignment of the ends of the optical fibers 30 and 31 with photodetector 85.

Each of the ferrules 43 and 44 has limited radial movement relative to housing 18 as they are free to move in any circumferential direction in recesses 51 and 66. Springs 54 and 69 allow the ferrules 43 and 44 to have limited radial movement as well as limited longitudinal movement relative to housing 18. In the event that there is any misalignment of the cone-shaped heads 47 and 62 relative to receptacles 74 and 83, the ferrules are free to compensate for any errors in alignment so as to ensure the desired precise alignment of the ends of the optical fibers with the light source 78 and photodetector 85.

The optical fiber connector assembly 10 insures that the ends of optical fibers 29, 30, and 31 are located in precisely the same location each time a connection is made. Housing 18 does not push directly on ferrules 43 and 44 when the connection is made. The contact between housing 18 and ferrules 43 and 44 is made through coil springs 54 and 69. The limited longitudinal and radial movement of ferrules 43 and 44 allows the ferrules to be guided into a selected precise position in the receptacle 74 and 83. The prior art optical connectors do not have this capability. Housing 18 does not directly force head 47 and 62 into receptacles 74 and 83 respectively. The flexible biasing members, such as springs 54 and 69, allow secure mounting of ferrules 43 and 44 on housing 18 and ensure that the heads of the ferrules are seated to maximum depth in receptacles 74 and 83 each time a connection is made. Ferrules 43 and 44 also have limited lateral movement which allow for the centering of heads 47 and 62 in their respective cone-shaped recess holes in receptacles 74 and 83 respectively in the event there is any misalignment of the ferrules and receptacles.

Connector housing 18 is released from instrument 11 by turning knob 17 to remove screw 16 from thread hole 14 in panel 13. Housing 18 is then withdrawn from panel 13. Heads 47 and 62 move out of receptacles 72 and 73. Stops 48 and 63 prevent ferrules 43 and 44 from being separated from housing 18.

While there has been shown and described a preferred embodiment of the optical fiber connector assembly of the invention it is understood the changes in the structure, materials, and uses may be made by those skilled in the art without departing from the invention. For example, optical fiber connector assembly can be used to couple two optical cables together. Housings having ferrules, such as ferrules 43 and 44, can be attached to opposite sides of a support having aligned receptacles, such as receptacles 74 and 83. The invention is defined in the following claims.

The embodiments of the invention in which an exclusive property or privilege is claimed are defined as follows:

1. An optical fiber connector assembly for coupling an optical fiber cable having at least one optical fiber to a support associated with means for transmitting or receiving light comprising: a housing, means releasably connecting said housing to said support to hold said housing in engagement therewith, said housing having means to connect an optical fiber cable thereto and passage means for accommodating an optical fiber of said cable, ferrule means mounted on said housing for supporting the optical fiber, sand ferrule means including a head having a cone-shaped outer surface, a flat forward end, and a longitudinal hole through said head open to said forward end, said optical fiber extended through said hole, means in said hole securing the optical fiber to said ferrule means to fix the position of the optical fiber relative to the ferrule means, said optical fiber having an end polished smooth and flush with said flat forward end of the head, said cone-shaped outer surface of the head being precision ground after the optical fiber has been secured to the ferrule means to concentrically locate said cone-shaped outer surface of the head about said end of the optical fiber, and receptacle means having a cone shaped recess complementary in size and shape to the cone-shaped outer surface of the head, said cone-shaped recess being aligned with and open to a means for transmitting or receiving light, said head being located in said cone-shaped recess with said cone-shaped outer surface of the head cooperating with the cone-shaped recess to locate the end of the optical fiber in precise radial alignment with said means for transmitting or receiving light.

2. The assembly of claim 1 wherein: said housing has a cavity accommodating said ferrule means, biasing means for biasing the head in a forward direction holding the head in said cone-shaped recess in the receptacle means, and stop means on said ferrule means engageable with said housing to limit forward movement of the head and limit backward movement thereof.

3. The assembly of claim 2 wherein: said means for biasing the head includes spring means surrounding the ferrule means engageable with the head and housing.

4. The connector assembly of claim 2 wherein: the means in said hole securing the optical fiber to said ferrule means is an epoxy.

5. The connector assembly of claim 1 wherein: the flat forward end of the head is transverse relative to the longitudinal hole in said head.

6. The connector assembly of claim 1 wherein: the cone-shaped outer surface of the head is precision ground by centering the head on a grinder operable to precision grind said cone-shaped outer surface to ensure concentricity with said end of the optical fiber.

7. A ferrule for an optical fiber connector assembly used to couple an optical fiber cable having as least one optical fiber to a support associated with means for transmitting or receiving light comprising: a body including a head having a cone-shaped outer surface, a forward end, and a longitudinal hole through said body open to the forward end, an optical fiber extended through said hole, means in said hole securing the optical fiber to said body to fix the position of the optical fiber relative to the body, said optical fiber having an end polished smooth and flush with said forward end of the head, said cone-shaped outer surface of the head being precision ground after the optical fiber has been secured to the body to concentrically locate said cone-shaped outer surface of the head about said end of the optical fiber.

8. The ferrule of claim 7 wherein: the means in said hole securing the optical fiber to said body is an epoxy.

9. The ferrule of claim 7 wherein: the forward end of the head is transverse relative to the longitudinal hole in said head.

10. The ferrule of claim 7 wherein: the cone-shaped outer surface of the head is precision ground by centering the head on a grinder operable to precision grind said cone-shaped outer surface to insure concentricity with said end of the optical fiber.

11. A method of making a ferrule for an optical fiber connector assembly, said ferrule having a head with a forward end and conical outer surface, and an optical fiber longitudinally secured to said ferrule, said fiber having an end flush with said forward end comprising: forming a longitudinal hole through the center of the ferrule, locating an optical fiber in said longitudinal hole, securing said fiber to the ferrule, polishing the end of the optical fiber until it is smooth and flush with a forward end of the head, and grinding the conical outer surface of the head to concentrically locate said conical outer surface of the head about said end of the optical fiber.

12. The method of claim 11 wherein: an epoxy located in said hole to secure said optical fiber to the ferrule.

13. The method of claim 11 wherein: the forward end of the head is polished transversally to the longitudinal hole through said head.

14. The method of claim 14 wherein: the conical outer surface of the head is ground by centering the head on a grinder operable to precision grind said conical outer surface to ensure concentricity with said end of the optical fiber.

* * * * *